Feb. 22, 1944.       C. C. FAWCETT       2,342,184
AUTOMATIC CONTROL FOR AIRCRAFT EQUIPMENT
Filed May 20, 1940       4 Sheets-Sheet 1
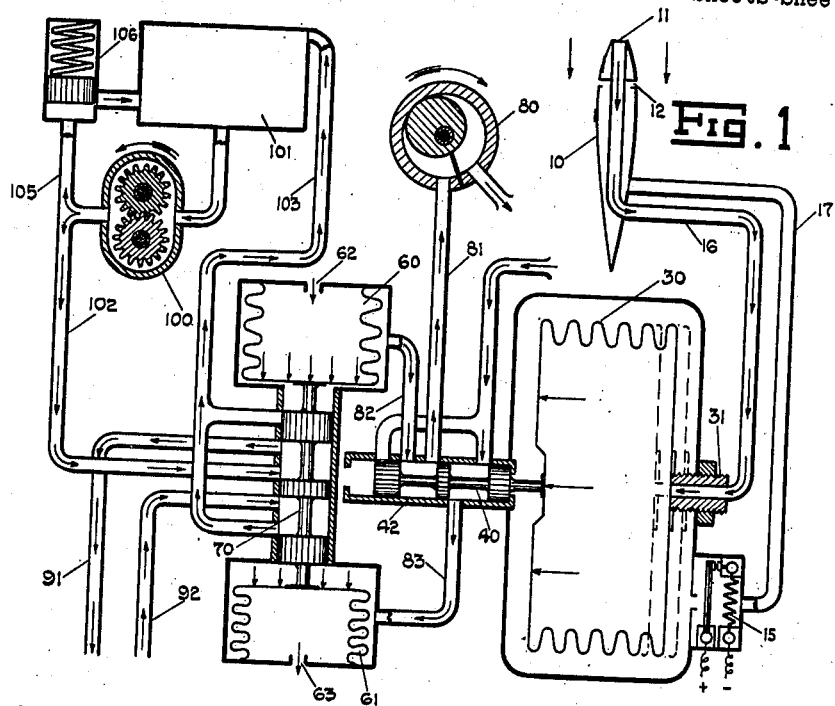
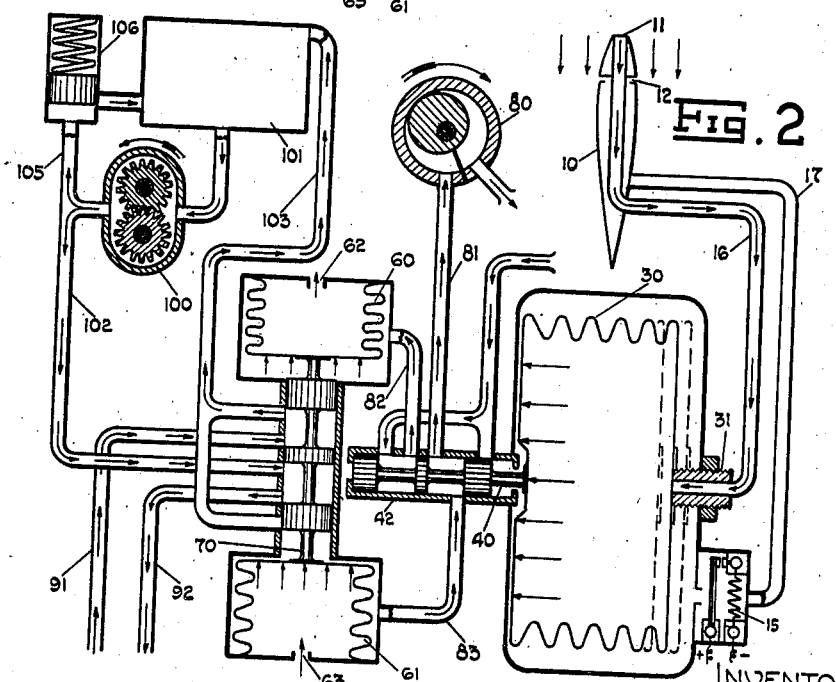
INVENTOR
CHARLES C. FAWCETT
BY
ATTORNEY

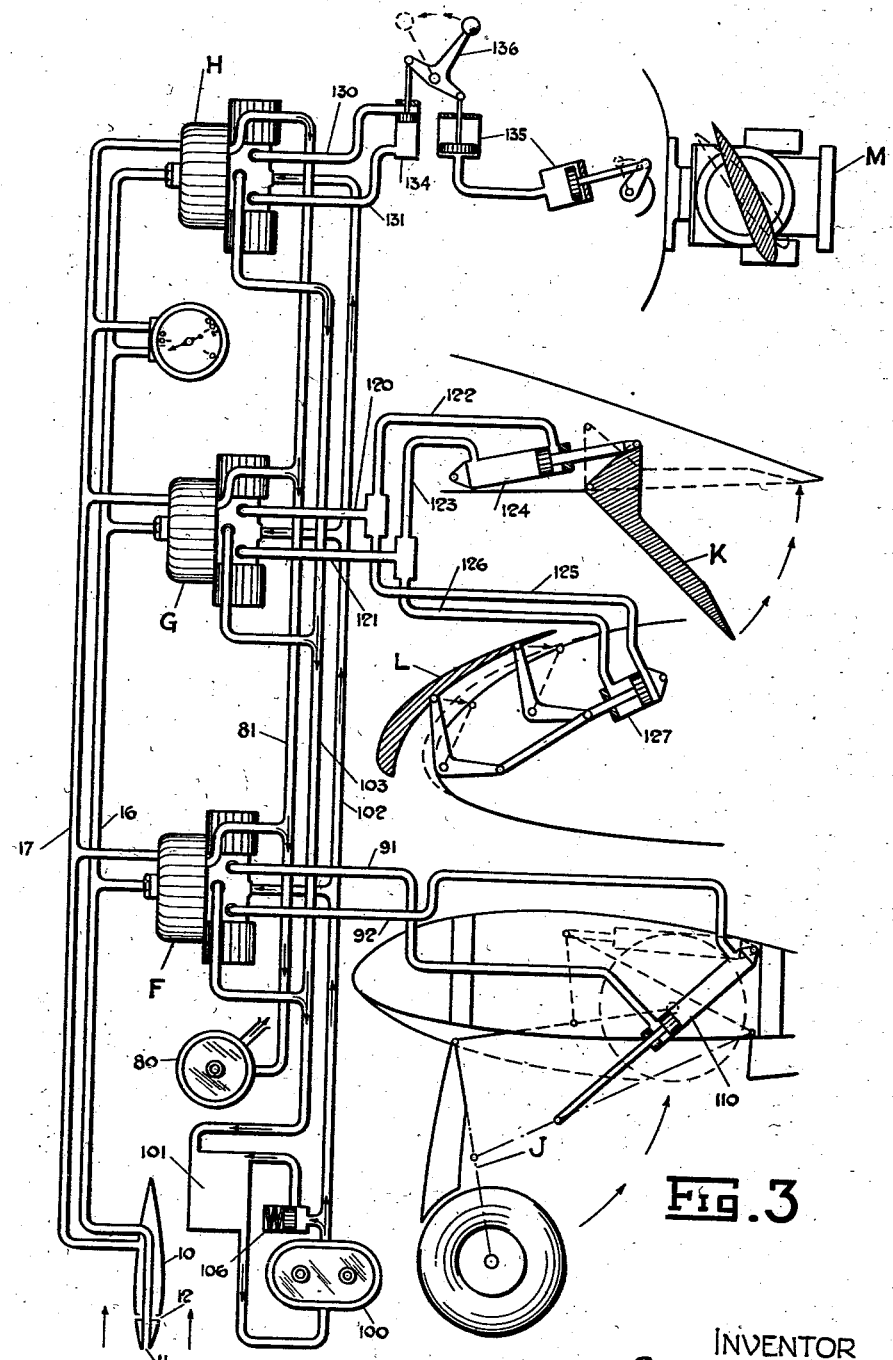

Feb. 22, 1944.　　　　C. C. FAWCETT　　　　2,342,184
AUTOMATIC CONTROL FOR AIRCRAFT EQUIPMENT
Filed May 20, 1940　　　　4 Sheets-Sheet 3

INVENTOR
CHARLES C. FAWCETT
BY
ATTORNEY

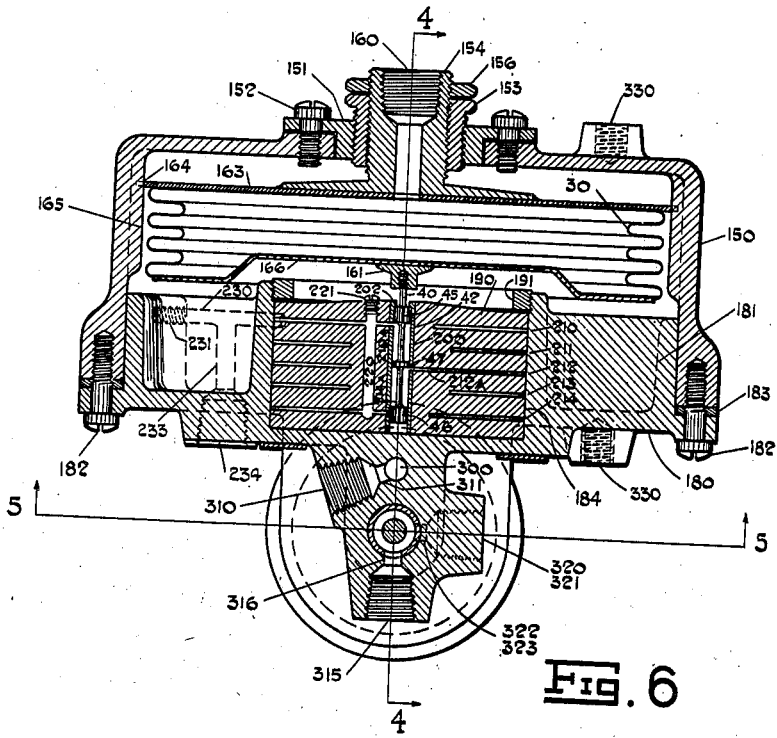

Patented Feb. 22, 1944

2,342,184

UNITED STATES PATENT OFFICE 2,342,184

AUTOMATIC CONTROL FOR AIRCRAFT EQUIPMENT

Charles C. Fawcett, Sackville, New Brunswick, Canada

Application May 20, 1940, Serial No. 336,241

4 Claims. (Cl. 121—46.5)

Introduction

This invention relates to an apparatus for exerting automatic control of aircraft equipment. Specifically, the invention provides apparatus for controlling, in response to the true air speed of the craft or its altitude, equipment which the pilot customarily operates manually. Generally speaking, this equipment includes means responsive to the ratio between the dynamic pressure set up by the speed of the plane and the static barometric pressure for converting this ratio into movement, in combination with means for amplifying the movement to initiate operation of the equipment.

The problem

Prior to this invention certain aircraft controls, either directly or indirectly dependent on air speed for the timing of their operation, have been left entirely to the judgment of the pilot. The operation of such controls usually occurs during the landing and take-off period when the pilot is pre-occupied with precision flying permitting him all too little time for attention to secondary aircraft controls.

With the increase in complexity and number of controls, it becomes more and more important that the human element be eliminated by the provision of automatic means for operating them.

Pieces of equipment which the pilot generally controls manually at a given airspeed and to which automatic control could advantageously be employed, are as follows:

1. The retractable undercarriage.
2. Flaps.
3. Wing slots.
4. The variable pitch airscrew.
5. Carburetor controls.
6. The engine boost.
7. Air brakes, particularly for dive bombing.
8. The retracting gear for wing tip floats.
9. Retractable seaplane float rudders.
10. Apparatus for imparting initial rotation to the landing gear wheels prior to landing.
11. Etc.

Pieces of equipment which the pilot generally operates manually at given altitudes or at given barometric pressures, and which could also be subject to automatic control for this purpose are the following:

1. Oxygen supply apparatus.
2. Cabin air compressors.
3. The engine supercharger.
4. The variable pitch airscrew.
5. Carburetor altitude control.
6. Etc.

Objects

Having regard to the foregoing, it is a principal object of the invention to provide apparatus responsive to airspeed for the automatic control of components and equipment of aircraft. It is a further object to provide apparatus of this nature which is simple, reliable in operation, economical to manufacture and to install in modern aircraft. It is a still further object of the invention to provide a compact control unit embodying the working parts of this apparatus ready for simple installation in a modern aircraft.

With these and other objects in view the invention may conveniently employ, to initiate control, an instrument responsive to the ratio between the dynamic and static pressures, calibrated so as, at a given airspeed or barometric pressure as the case may be, to set a "Servo" unit in operation. This unit amplifies the movement of the instrument in furnishing adequate force to ensure operation of a further valve controlling the direction of flow of hydraulic pressure.

Drawings

This general description will be better understood by reference to the accompanying drawings illustrating preferred forms of apparatus in which the invention is embodied and in which:

Figure 1 is a diagrammatic view of this preferred form of apparatus, showing the elements in the position they assume prior to their response to a predetermined airspeed.

Figure 2 is a diagrammatic view of the apparatus shown in Figure 1 with the elements in the position they assume after response to the predetermined airspeed.

Figure 3 is a diagrammatic view showing three airspeed-sensitive automatic controls responsive respectively to different airspeeds, for controlling different pieces of aircraft equipment, namely the retractable undercarriage, aerodynamic flaps and slats, and the airscrew pitch setting.

Figure 4:
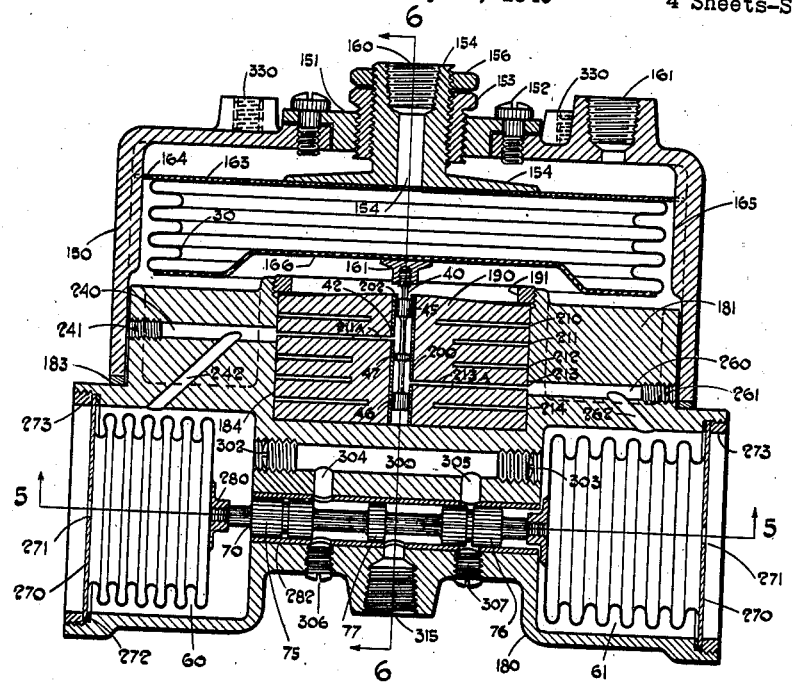
Figure 5:
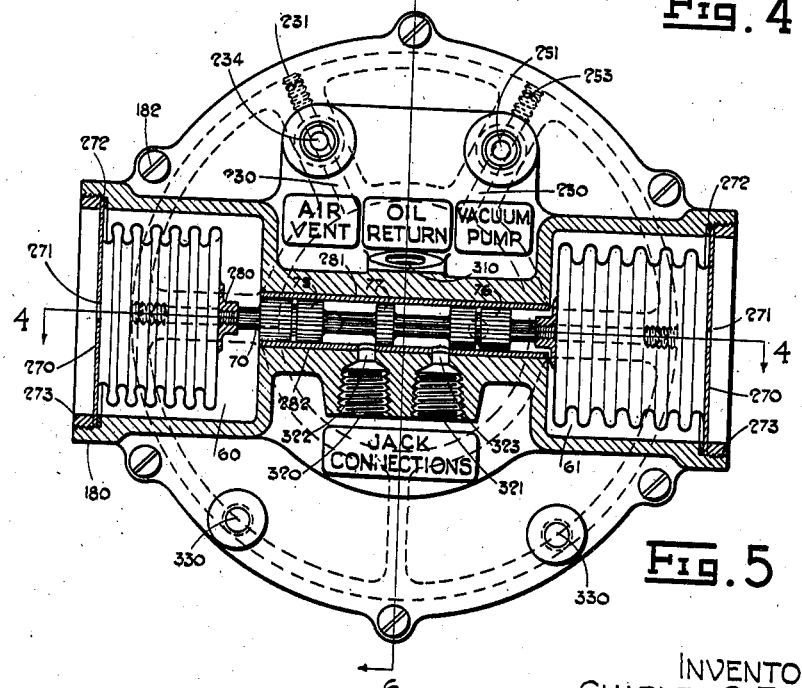

Figure 4 is a cross section taken through the centre line 4—4 of Figures 5 and 6 of a preferred piece of equipment embodying the elements illustrated diagrammatically in Figures 1 and 2.

Figure 5 is a cross section through the piece of equipment of Figure 4 taken transversely of the latter at the line 5—5, on Figures 4 and 6.

Figure 6 is a section of the equipment shown in Figures 4 and 5 taken through the centre line 6—6.

Figure 7 is a diagrammatic view illustrating the application of the preferred form of apparatus shown in the previous figures, to an electrical control.

General arrangement

The general arrangement and principle of the apparatus may be gathered by referring to Figures 1 and 2 of the drawings. 10 represents an electrically heated Pitot head mounted at the leading edge of a wing and having an opening 11 for picking up dynamic pressure in response to the speed of the craft and another opening 12 for static or barometric pressure.

The Pitot head 10 is connected as in conventional airspeed indicators, by dynamic and static pressure lines 16 and 17 respectively, to an instrument for converting the ratio between the dynamic and static pressure into movement, in this case a Sylphon or bellows 30. A heater 15 controlled by a thermostat is provided to heat the static pressure line 17 so as to keep the air circulating in the bellows housing at a constant temperature, so as to free this instrument from temperature variation. The moveable wall of this bellows is connected to the stem 40 of a sliding valve controlling a pressure system which, as will be described, operates the twin bellows 60 and 61 of a Servo unit.

Pressure is induced in the Servo unit by a vacuum pump 80. A pressure line 81 leads from the vacuum pump to the chamber 42 of the valve 40 through the movement of which it may be connected to the housing of either bellows 60 or 61 through pressure lines 82 and 83 respectively. Openings 62 and 63 connect the inside of the bellows 60 and 61 with the atmosphere.

The twin bellows 60 and 61 are connected to the stem of the sliding valve 70 which is the main control valve for controlling the direction of flow of oil to hydraulic jacks operating the equipment. The connection of the instrument with various pieces of equipment can be seen in Figure 3 and will later be described in detail.

The hydraulic system includes an oil pump 100 receiving its supply from an oil tank 101. Pressure lines 91 and 92 lead from the housing of the valve 70 to a hydraulic jack on the particular piece of equipment. Flow in these lines is induced by pressure from the oil pump through a supply line 102 and a return line 103, the direction of flow in the lines 91 and 92 being governed by the position of the valve 70. That is to say, when the valve 70 is in the position of Figure 1, there is a positive flow in the line 91 and a return flow in the line 92 and, when the valve is in the position of Figure 2 the opposite is the case. When the equipment is static in the operative or non-operative position the oil merely passes through a relief line 105 past a relief valve 106 back to the tank 101.

Operation

Suppose, for the moment, the apparatus is being used for the automatic lowering or retraction of the landing gear. When the craft is flying at a low speed the dynamic pressure on the Pitot head is substantially balanced by the static pressure and the bellows 30 remains in the contracted position of Figure 1. When, however, the airspeed increases to a predetermined rate to which the bellows 30 is calibrated, say 100 M. P. H., the dynamic pressure overcomes the static and the bellows 30 is expanded into the position of Figure 2. This moves the valve stem 40 into the position of Figure 2 causing the air to be exhausted from the housing of the bellows 61, neutralizing the pressure in the bellows 60 by admitting atmospheric pressure both into the housing and into the bellows itself. This causes the valve stem 70 to move into the position of Figure 2. This immediately causes reversal of the oil flow in the lines 91 and 92 causing the hydraulic actuating means of the undercarriage to operate in retracting it.

If it is desired to use the instrument for automatic control at given altitudes, as for instance for control of pieces of equipment mentioned above, it will be merely necessary to seal off from the inside of the bellows the dynamic pressure line 16 and to calibrate the instrument so that static pressure alone operates the bellows at a certain altitude.

By this arrangement the load imposed on the main hydraulic system control valve 70 is all taken up in the twin bellows 60 and 61 of the servo unit. Considerable force is available for operating these bellows, from the forced pressures set up by the vacuum pump 80. This relieves the servo unit control valve and consequently the sensitive bellows 30 responsive to dynamic and atmospheric pressure, from any load. By reference to the figures it will be seen that, owing to the construction of the valve 40, the pressures on opposite sides of its pistons are always balanced. Therefore, the operation of the valve offers practically no resistance, and it is thus accurately responsive even to the slightest force acting upon it.

Since the bellows 30 is responsive to the ratio between dynamic and static pressures rather than merely responsive to dynamic pressure, the desired airspeed is registered no matter what the altitude. If the dynamic pressure line 16 is sealed off, the instrument is responsive to barometric pressure alone.

Bellows 30 is fastened to an adjustable mounting 31 in such a way that the initial tension on the bellows may be varied so that it will become operative at any predetermined airspeed.

Automatic control of various pieces of equipment

Figure 3 illustrates the application of the apparatus described in conjunction with Figures 1 and 2 to the operation of various pieces of equipment. In this figure, the Pitot head 10 is shown connected to three units F, G and H, each embodying an arrangement similar to that described in Figures 1 and 2. For changing the direction of flow of oil pressure directly in relation to airspeed, the dynamic and static pressure lines 16 and 17 respectively are connected in parallel to these units. The other elements of the apparatus are denoted by the same numbers as in connection with Figures 1 and 2, for instance the vacuum pump 80, the oil lines 91, 92, 102, 103, 105, etc., the oil tank 101, and the pump 100, etc.

J represents a retractable undercarriage operated by a hydraulic jack 110 to which hydraulic pressure controlled by the unit F is supplied to the lines 91 and 92. The unit F is so calibrated that, at 100 M. P. H., the pressure in the lines 91 and 92 is reversed and the piston of the hydraulic jack forced upwards, retracting the undercarriage. When the speed falls below 100 M. P. H., the flow is reversed again and the undercarriage moved back into the position indicated in the full lines of the figure.

K represents aerodynamic flaps and L aerodynamic slats. Oil lines 120 and 121 lead from the unit G to connections with oil lines 122 and 123 leading to a jack 124, which controls the flaps K. The lines 120 and 121 are also connected to lines 125 and 126 leading to a jack 127 which controls the slats L. The unit G is calibrated so that at 120 M. P. H. the oil flow in the lines 120 and 121 is reversed, as a result reversing the disposition of the piston in the jacks 124 and 127 respectively so that the slats and flaps are moved into the position shown in dotted lines.

M represents a two-piece airscrew. Lines 130 and 131 carry hydraulic pressure from the unit H and to a jack 134 operating apparatus 135 for changing the pitch of the airscrew. As indicated this apparatus 135 can also be operated manually by the over-control 136. The unit H is calibrated so that at 150 M. P. H. the flow in the lines 130 and 131 is reversed and the pitch of the airscrew changed to a high-pitch setting. When the speed falls below 150 M. P. H. the flow is reversed again and the pitch of the screw changed back to a low-pitch setting.

Preferred control unit structure

The working parts of the control apparatus proper shown diagrammatically in the previous figures can conveniently be embodied in a compact unit all ready for simple installation in an aircraft. This unit is accommodated in a housing 150 for the main bellows and a casing 180 for the Servo unit, the casing having an extension 181 fitting within a part of the housing. This extension includes a large centrally arranged cylindrical recess, into which there fits a special passage-forming housing 190 for the Servo unit control valve 40. All the connections indicated in Figures 1 and 2 between the air or hydraulic lines and the Servo and main control valve chambers are made by way of cooperating orifices in the housing 150, casing 180, or in the special passage-forming housing 190. This important structure will be described in further detail.

The end of the casing 150 is provided with an opening permitting the insertion of a screw-threaded adjustment-retaining ring 151, held in place by screws 152. Into this ring is screwed a hollow adjustment screw 153, provided on the outside with a right-hand, and on the inside with a left-hand thread. Into the adjustment screw is inserted a tubular dynamic pressure connection 154 to the bellows, which is provided outside with a left-hand thread and which has inside a threaded pipe connection 160 for the dynamic pressure line. A threaded pipe connection 161 is provided in the bellows housing 150 for the attachment of the static pressure line. A locking nut 156 is provided to hold the adjustment screw 153 from rotation. The bellows 30 is mounted on the end of the dynamic pressure connection 154. A plate 163 reinforces the end of the bellows and also includes a notched protuberance 164 to engage a rib 165 on the casing 150 so as to retain the bellows from rotation during calibration and adjustment. The bellows is metallic and calibrated to expand under a predetermined pressure. The movable end of the bellows 30 is connected to a small housing 161 screwed to the stem 40 of the valve controlling the Servo unit. A plate 166 reinforces the movable end of the bellows.

The extension 181 slides into the casing 150 and is held in place by screws 182. A gasket 183 completes a pressure-tight connection between the two casings. The Servo unit control valve housing 190, fits into the recess 184 of the extension 181 held in place by a retaining ring 191 screw-threaded to the extension at the end of the recess.

Special valve housing

The housing 190 is of a special construction believed to be novel, consisting of a cylindrical casting machined to an exact fit in the recess 184 and otherwise formed as follows. To accommodate the piston of the sliding valve 40, the housing is provided with an axial boring 200 in which is inserted the cylindrical sleeve 42, preferably of stainless steel constituting a chamber in which the valve piston is freely movable. The fit of the valve piston is such that it will under all conditions move very freely within the sleeve. The upper end of the sleeve is provided with projections 202 limiting the movement of the valve piston in the upward direction while movement in the downward direction is limited by the base of the cylindrical recess 184.

In order to provide the necessary connections between the valve chamber and the air lines the housing is formed as follows. First, it is provided with a series of circular grooves 210 to 214, the grooves being machined out on a lathe, with the top and bottom grooves slightly deeper than the intermediate three grooves so that they can be interconnected by a longitudinal boring 220, which clears the intermediate grooves. The outer end of this boring is sealed by a grub-screw 221.

Each groove is connected with the valve chamber by its respective radial boring 210a to 214a. These small diameter borings are accurately placed in a longitudinal direction with respect to the valve chamber as the machined circular grooves act as a guide for the small diameter drill used to form the radial borings. This method greatly facilitates manufacture of a compact unit. The groove 210 registers with a radial boring 230 in the outer casing which in turn registers with a longitudinal boring 233 having a pipe connection 234. This connection opens to the atmosphere. The radial end of the boring 230 is sealed by a grub-screw 231. Similarly the groove 211 registers with a radial boring 240, which is joined to the housing of the bellows 60 by a diagonal boring 242, the radial end of the boring 240 being closed by a grub-screw 241.

In a like manner the groove 212 registers with a radial boring 250 in the casing and is connected by a longitudinal boring leading to a pipe fitting 251, which in turn is connected to the vacuum pump. The radial boring 250 is closed with a grub-screw 253. Similarly, the radial groove 213 connects, by way of a boring 260 and a diagonal boring 262, with the housing of the bellows 61.

The grub-screw 261 closes the end of the radial groove 260.

The groove 214 connects with the groove 210 by the longitudinal boring 220 in the housing 190.

With this structure it can readily be seen that the housing 190 fulfils the function of completing the connections between the valve chamber 42 and the lines leading through the casing 180, to the respective elements of the Servo unit.

The stem 40 of the Servo unit control valve carries end pistons 45 and 46, and a centre piston 47, which serves to make or break the pneumatic line connections, as in the manner of a sliding valve and as will be clearly seen by reference to Figures 1 and 2.

The lower part (in the position of Figure 4) of the casing 180 is machined out to form the chamber of the bellows 60 and 61. The outer end of each bellows is mounted on a diaphragm 270 provided with the centrally arranged orifice 271 open to the atmosphere. The diaphragm 270 is mounted by means of a gasket 272 and retaining ring 273, screw-threaded into the end of the bellows chamber. The movable end of each bellows is provided with a housing 280 screw-threaded to the stem of the main control valve 70.

The chamber of the main control valve is formed by a boring 281 extending between the two bellows chambers and lined with a stainless steel sleeve 282. The oil return duct is formed by a boring 300 between the two bellows chambers and sealed off at each end by grub-screws 302 and 303, the boring being connected with the valve chamber by transverse borings 304 and 305 sealed off from the outside of the casing by grub-screws 306 and 307. The boring 300 is connected to the oil return pipe fitting 310 by a diagonal boring 311.

The oil pressure supply pipe connection 315 is connected to the valve chamber by a longitudinal boring 316, while the jack connections with the valve chamber are made through pipe connections 320, 321 leading to respective borings 322 and 323.

The stem 70 of the main control valve for the hydraulic system includes end pistons 75 and 76, and a centre piston 77, which serves to make or break the hydraulic connections, as in the manner of a sliding valve and as will be seen clearly by reference to Figures 1 and 2.

Lugs 330 are provided for mounting the control unit to the aircraft, as for instance under the pilot's floor, or in any other suitable position.

The operation of this unit will be best gathered by reference to the diagrammatic representations of Figures 1, 2 and 3 and the attendant description.

Electric control

The application of the invention to controlling electrically-operated equipment is shown diagrammatically. The elements of the Servo unit common to the hydraulic control have been numbered correspondingly. In this electrical control, however, the twin Servo bellows 60 and 61, instead of being associated with a hydraulic valve are connected to the respective ends of an electric switch bar 350 moveable axially of an insulated switch housing 345. The switch bar is provided with male contacts 353 and 354 which, on movement of the valve, engage with female contacts 355 and 356 or 356 and 357, as the case may be. The contact 355 has a positive connection, the contact 357 a negative connection and 356 a neutral connection. Movement of the switch between the contacts causes a reversal of flow of the current in the circuit actuating the control for the equipment being operated.

Advantages

The compactness of the particular unit described makes it possible to mount it in a very small space; it is also very light in weight. By the nature of its structure the unit requires no attention except for the normal periodical instrument check-up. In operation, it will function smoothly and reliably, removing considerable responsibility from the shoulders of the pilot at all times, particularly when he is pre-occupied with precision flying. No additional equipment is required with the preferred unit.

It will be understood that various other modifications may be made in this invention without departing from the spirit thereof or the scope of the claims, and therefore the exact forms shown are to be taken as illustrative only and not in a limiting sense, it being desired that only such limitations shall be placed thereon as are set forth in the accompanying claims.

The sub-titles used throughout the specification are merely to simplify reference thereto and should otherwise be disregarded.

I claim:

1. In a unit for controlling aircraft equipment a casing, a main sliding control valve for said equipment mounted in said casing, said casing being formed to include a bellows housing at each end of said control valve, a bellows in each housing connected to a respective end of said control valve, an atmospheric pressure passage to the interior of each of said bellows, a cylindrical boring in said casing, pressure supply passages between each bellows housing and the walls of said boring, a vacuum pump, pressure supply passages from the wall of said boring leading to said vacuum pump, a passage from the wall of said boring leading to an atmospheric pressure connection, a cylindrical valve housing inserted within said boring, said valve housing including an axial passage forming a valve chamber, openings in said valve housing to complete communication between said chamber and each of said pressure supply passages, an additional opening in said housing leading from said valve chamber to the atmospheric pressure passage, a sliding pressure control valve in said chamber for controlling said pressure supply passages and pressure responsive means for actuating said sliding pressure control valve whereby control is exercised over said main control valve.

2. An apparatus as claimed in claim 1 wherein the passages in said valve housing are formed by a plurality of circular grooves therein, borings extending between said grooves and the valve chamber, one pair of grooves being outside the other grooves and deeper, and a longitudinal boring connecting said outside grooves without touching the other grooves, the outside grooves communicating with the passage leading to the atmosphere.

3. In a unit for controlling aircraft equipment, a compact casing, a main sliding control valve for said equipment mounted in said casing, said casing being formed to include a bellows housing, a bellows in said housing operatively connected to said control valve, a recess in said casing, a valve housing inserted within said recess, said valve housing including an axial passage forming a valve chamber, a communication passage leading from the bellows housing to the wall of the recess, pressure supply connections, pressure supply passages leading from the wall of the recess to said pressure supply connections, openings in said valve housing constituting communications between said valve chamber and each of said pressure supply passages, said openings and pressure supply passages permitting fluid pressure to be transmitted from said pressure connections to said bellows, a sliding pressure control valve in said chamber for controlling the communication between the respective openings thereby to control communication between the pressure supply connections and the bellows, and pressure responsive means for actuating said pressure control valve thereby to exercise control over said main control valve.

4. An apparatus, as claimed in claim 3, wherein said recess is circular, and said valve housing cylindrical, the passages in said valve housing being formed by a plurality of circular grooves therein, and borings extending between said grooves and valve chamber.

CHARLES C. FAWCETT.